United States Patent
Kishimoto

(10) Patent No.: US 6,552,822 B1
(45) Date of Patent: Apr. 22, 2003

(54) IMAGE PROCESSING METHOD AND APPARATUS

(75) Inventor: Masaki Kishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/255,365

(22) Filed: Feb. 23, 1999

(30) Foreign Application Priority Data

Feb. 24, 1998 (JP) .............................. 10-042214

(51) Int. Cl.[7] .......................... H04N 1/405; H04N 1/409
(52) U.S. Cl. ...................... 358/3.03; 358/3.26; 382/252
(58) Field of Search .............................. 358/3.03, 3.04, 358/3.05, 3.1, 3.26, 1.9; 382/252

(56) References Cited

U.S. PATENT DOCUMENTS

| 5,467,201 | A | * | 11/1995 | Fan ............................ 382/252 |
| 5,757,976 | A | * | 5/1998 | Shu ............................ 382/252 |
| 5,809,177 | A | * | 9/1998 | Metcalfe et al. ............ 358/3.05 |
| 5,880,857 | A | * | 3/1999 | Shiau et al. ................ 358/3.03 |
| 6,181,827 | B1 | * | 1/2001 | Kishimoto .................. 382/252 |
| 6,449,061 | B2 | * | 9/2002 | Metcalfe .................... 358/3.05 |

* cited by examiner

Primary Examiner—Scott Rogers
(74) Attorney, Agent, or Firm—Reed Smith Crosby Heafey LLP

(57) ABSTRACT

A multiple-level error diffusion processing is performed to obtain an image of a high quality with uniform texture and reduced roughness, while reducing a gradation level. An image processing apparatus comprises a first error diffusion processing section for selectively performing error diffusion processing on input image data according to its gradation values and a second error diffusion processing section for performing error diffusion processing of three or more quantization levels on the output data of the first error diffusion processing section for outputting as output image data. A selective quantization section of the first error diffusion processing section performs such a quantization that errors are supplemented selectively centering a portion where no error is produced through quantization in a quantization section of the second error diffusion processing section.

10 Claims, 15 Drawing Sheets gradation level of
original image signal

IMAGE PROCESSING METHOD AND APPARATUS

BACKGROUND OF THE INVENTION

1. Field of the Invention

The present invention relates to an image processing method.and apparatus for reducing the number of gradation levels of image data through performing error diffusion processing with multiple levels.

2. Description of the Related Art

When an image with a multiple-level gradation obtained through a computer or an image input apparatus, for example, is outputted through an image output apparatus such as a printer with a fewer gradation level, the number of gradation levels of the image data is required to be reduced. Pseudo halftone representation has been conventionally utilized for maintaining the image quality of an original image as high as possible while reducing the number of gradation levels. Among several methods of the pseudo halftone representation, an error diffusion method capable of producing a high-quality image has been widely used for printers with two levels of output gradation, for example. Also, a multiple-level error diffusion method with three or more quantization levels has been proposed for an image output apparatus capable of representing three or more gradation levels. It is to be noted that the error diffusion method is a method of diffusing a quantization error resulting from a target pixel into input image data of unquantized pixels near the target pixel.

The general principle of the error diffusion method will now be described in detail with reference to Hitoshi Takaie and Mitsuo Yae, 'Gradation Conversion Technique of Digital Image Data with C', in Interface, August 1993, pp. 158–171.

The error diffusion method is to represent pseudo halftones through modulating quantization errors into a high frequency band to be less perceptible considering a characteristic of human visual perception. FIG. 1 is a block diagram of an image processing apparatus for implementing typical error diffusion processing. The image processing apparatus comprises: a subtracter 211 for subtracting output data of a filter 214 described below from input image data x (i, j); a quantizer (shown as Q) 212 for quantizing output data of the subtracter 211 and outputting the result as output image data y (i, j); a subtracter 213 for subtracting output data of the subtracter 211 from output image data y (i, j); and the filter 214 for performing specific filtering process on the output data of the subtracter 213 and outputting the result to the subtracter 211. In the drawing, e (i, j) represents a quantization error produced through quantization at the quantizer 212. Therefore, the output data of the subtracter 213 is quantization error e (i, j). Coordinates of two directions intersecting at right angles each other are represented by 'i' and 'j', respectively. The two directions will be called i direction and j direction, respectively.

The filter 214 is a sort of linear filter. The transfer function thereof is determined to be G ($z_1$, $z_2$). Signs $z_1$, and $z_2$ are variables in z transformation in i direction and j direction, respectively. The overall configuration of the image processing apparatus shown in FIG. 1 is regarded as a two-dimensional sigma-delta modulation circuit. Therefore, expression (1) below is given for the relationship of input and output in the image processing apparatus.

$$Y(z_1,z_2)=X(z_1,z_2)+H(z_1,z_2)E(z_1,z_2) \qquad (1)$$

In the expression (1), Y($z_1$, $z_2$), X($z_1$, $z_2$) and E($z_1$, $z_2$) are values produced through z transformation of y (i, j), x (i, j) and e (i, j), respectively. Transfer function H($z_1$, $z_2$) of the filter for modulating quantization error E($z_1$, $z_2$) is given by an expression (2) below.

$$H(z_1,z_2)=1-G(z_1,z_2) \qquad (2)$$

The transfer function H($z_1$, $z_2$) represents a high-pass filter of two-dimensional finite impulse response (FIR). The high-pass filter is a filter for modulating quantization errors which determine a modulation characteristic of quatization error E($z_1$, $z_2$) to a higher frequency band. In the following description, filters indicated with transfer functions H($z_1$, $z_2$) and G ($z_1$, $z_2$) are shown as filter H($z_1$, $z_2$) and filter G ($z_1$, $z_2$), respectively.

G($z_1$, $z_2$) is given by an expression (3) below.

$$G(z_1,z_2)=\Sigma\Sigma g(n1,n2)z_1^{-n1}z_2^{-n2} \qquad (3)$$

The first $\Sigma$ in the expression (3) indicates a sum when n1 is from $-N_1$ to $M_1$. The second $\Sigma$ in the expression (3) indicates a sum when n2 is from $-N_2$ to $M_2$. Each of $N_1$, $M_1$, $N_2$ and $M_2$ is a predetermined positive integer.

A filter coefficient is given by g (n1,n2) and a target pixel by n1=0 and n2=0.

However, the quality of an image deteriorates in the multiple-level error diffusion method with fewer quantization levels. For example, when tones of an original image are close to the quantization levels, texture variations are conspicuous and pseudo contours are produced. This is caused by an absence of a random pattern specific to the error diffusion method, which is partly found in an output image. When a tone of original image data is close to a quantization level, an output level is a single quantization level and thereby it results in the absence of the random pattern results.

In order to prevent effectively image quality deterioration due to texture variations, a method is known for superimposing a regular pattern or random noise on image data. However, the method increases errors in every gradation level in original image data. This sacrifices the best feature of the error diffusion method for producing minimized errors. Consequently, the texture of the regular pattern does not match the texture of the error diffusion method. Another problem is, for example, enhanced roughness in an output image.

Also, a method has been proposed for step-by-step error diffusion processing with levels of two to three, then to five as disclosed in Hiroshi Ochi, 'High Quality Multiple-level Error Diffusion Method using Gradation Level Processing', Processing of Image Electronics Institute, 24, 1, pp. 10–17, 1995-01. However, it takes longer time in performing computation required by the step-by-step processing. Another problem is that roughness is greater since four output levels or above may be used for representing a particular gradation level. A compensation process thereof is required, too.

SUMMARY OF THE INVENTION

In view of the above problems, it is an object of the present invention to provide an image processing method and apparatus capable of producing a high-quality image with a uniform texture and reduced roughness through a multiple-level error diffusion processing while reducing the number of gradations of image data.

An image processing method of the present invention comprises a first error diffusion processing step and a second error diffusion processing step. The first error diffusion processing step quantizes input image data for each pixel to convert the quantized input image data into image data having a predetermined quantization level for outputting and diffuses a quantization error of a target pixel produced through quantization to input image data of an unquantized pixel near the target pixel when the gradation value of the input image data is within a predetermined quantization-executable range, and outputs the input image data without quantizing the input image data when the gradation value is not within the predetermined quantization-executalbe range. The second error diffusion processing step quantizes the image data outputted by the first error diffusion processing step for each pixel to convert the quantized image data into output image data having one of three or more quantization levels including a quantization level different from the quantization level in the first error diffusion processing step for outputting and diffuses a quantization error of the target pixel produced through quantization to image data of an unquantized pixel near the target pixel.

An image processing apparatus of the present invention comprises first error diffusion processing means and second error diffusion processing means. The first error diffusion processing means comprises selective quantization means for quantizing input image data for each pixel to convert the quantized input image data into image data having a predetermined quantization level for outputting and diffusing a quantization error of a target pixel produced through quantization to input image data of unquantized pixel near the target pixel, when the gradation value of the input image data is within a predetermined quantization-executable range, and for outputting the input image data without quantizing the input image data, when the gradation value is not within the predetermined quantization-executable range; and first error diffusion means for diffusing a quantization error of a target pixel produced through quantization into input image data of an unquantized pixel near the target pixel, when the gradation value of the input image data is within a predetermined quantization-executable range, and for outputting the input image data without quantizing the input image data, when the gradation value is not within the predetermined quantization-executable range. The second error diffusion processing means comprises quantization means for quantizing the image data outputted by the first error diffusion processing means for each pixel to convert the quantized image data into output data having one of three or more quantization levels including a quantization level different from the quantization level at the first error diffusion processing means for outputting; and second error diffusion means for diffusing a quantization error of the target pixel produced through quantization to image data of an unquantized pixel near the target pixel.

According to the image processing method of the invention, in the first error diffusion processing step, when the gradation value of the input image data is within the predetermined quantization-executable range, the input image data is quantized for each pixel to be converted to image data having the predetermined quantization level for outputting and the quantization error of the target pixel produced through quantization is diffused into input image data of an unquantized pixel near the target pixel. Also, in the first error diffusion processing step, when the gradation value of the input image data is not within the predetermined quantization-executable range, the input image data is outputted without quantization thereof In the second error diffusion processing step, the image data outputted by the first error diffusion processing step is quantized for each pixel to be converted to output image data having one of three or more quantization levels including a quantization level different from the quantization level in the first error diffusion processing step for outputting and the quantization error of the target pixel produced through quantization is diffused into image data of an unquantized pixel near the target pixel.

According to the image processing apparatus of the invention, in the first error diffusion processing means, input image data is quantized for each pixel to be converted into image data having a predetermined quantization level for outputting and a quantization error of a target pixel produced through quantization is diffused to input image data of unquantized pixel near the target pixel when the gradation value of the input image data is within a predetermined quantization-executable range, and the input image data is outputted without quantizing the input image data when the gradation value is not within the predetermined quantization-executable range by the selective quantization means, and a quantization error of a target pixel produced through the quantization at the selective quantization means is diffused into input image data of unquantized pixel near the target pixel by the error diffusing means. In the second error diffusion processing means, the image data outputted by the first error diffusion processing means is quantized for each pixel to be converted into output data having one of three or more quantization levels including a quantization level different from the quantization level at the first error diffusion processing means for outputting by the quantization means, and a quantization error of the target pixel produced through the quantization at the quantization means is diffused into image data of an unquantized pixel near the target pixel by the second error diffusion means.

Other and further objects, features and advantages of the invention will appear more fully from the following description.

DETAILED DESCRIPTION OF THE PREFERRED EMBODIMENTS

Preferred embodiment of the invention will now be described in detail with reference to the accompanying drawings.

First, for comparison with embodiments of the invention, an image processing method and an image processing apparatus (referred to as image processing method and image processing apparatus of a comparative example) will be described. The image processing method and image processing apparatus of a comparative example have been disclosed in Japanese Patent Application No. 9-150442 which has been proposed by the present applicant. The object thereof is similar to that of the current invention. The invention is directed to improvement in the apparatus and method of the comparative example.

Figure 14:
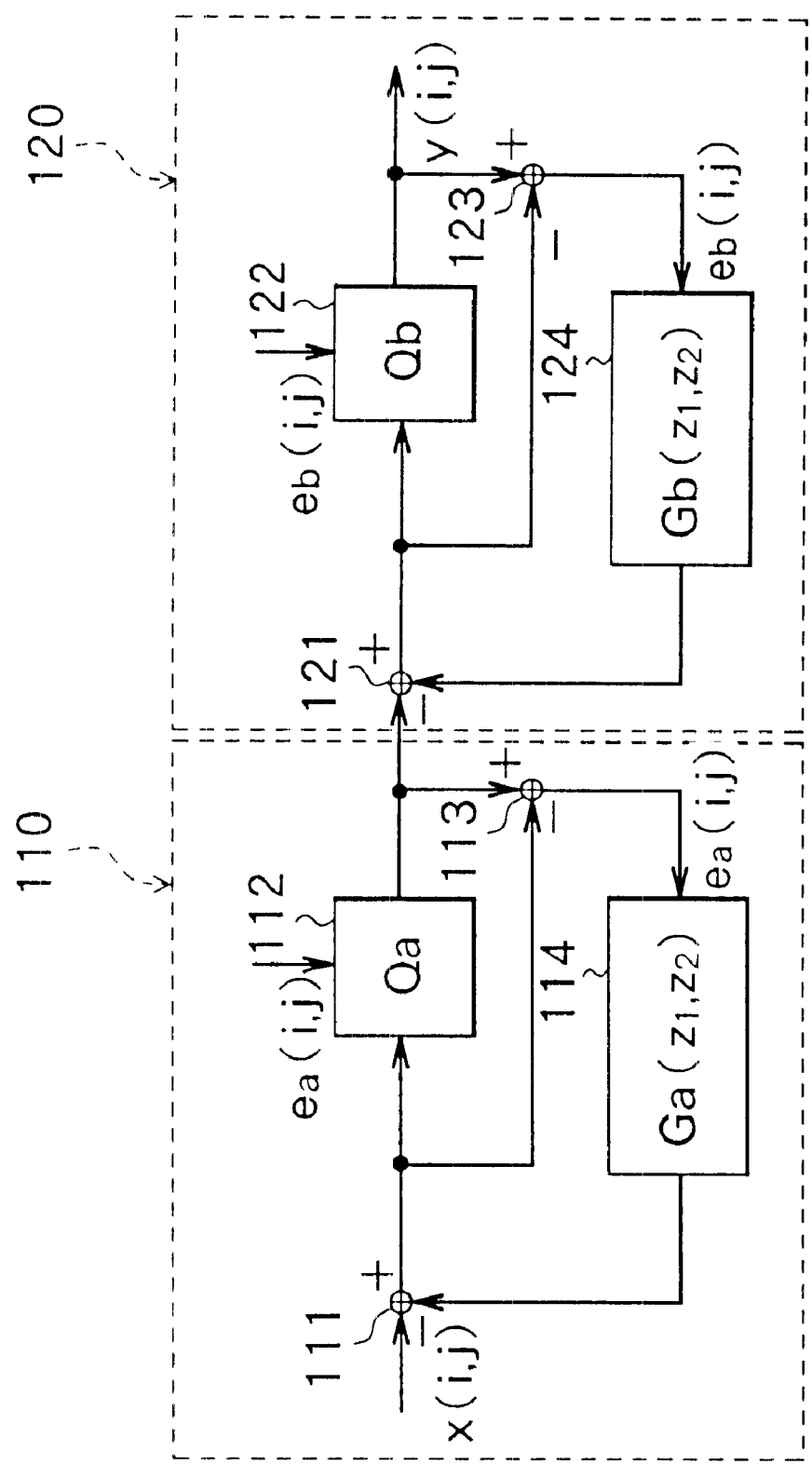
FIG. 14 is a block diagram showing a configuration of an image processing apparatus of a comparative example compared with the first embodiment of the invention.

FIG. 14 is a block diagram showing a configuration of the image processing apparatus of the comparative example. This image processing apparatus comprises a first error diffusion processing section 110 for performing error diffusion processing with quantization levels of three or more on input image data $x(i, j)$ for producing an output and a second error diffusion processing section 120 for performing error diffusion processing with quantization levels of three or more on the data outputted from the first error diffusion processing section 110 for producing output image data $y(i, j)$ for outputting.

The first error diffusion processing section 110 comprises: a subtracter 111 for subtracting output data of a filter 114 described below from input image data $x(i, j)$; a quantizer (shown as $Q_a$) 112 for quantizing the output data of the subtracter 111 based on quantization levels of three or more for outputting as output data of the first error diffusion processing section 110; a subtracter 113 for subtracting the output data of the subtracter 111 from the output data of the quantizer 112; and the filter 114 for performing a predetermined filtering process on the output data of the subtracter 113 for outputting to the subtracter 111. In the figure, $e_a(i, j)$ represents a quantization error produced through quantization at the quantizer 112. Therefore, the output data of the subtracter 113 is quantization error $e_a(i, j)$. The filter 114 is a sort of linear filter. The transfer function thereof is determined to be $G_a(z_1, z_2)$.

The second error diffusion processing section 120 comprises: a subtracter 121 for subtracting output data of a filter 124 described below from the output data of the first error diffusion processing section 110; a quantizer (shown as $Q_b$) 122 for quantizing the output data of the subtracter 121 based on quantization levels of three or more including levels different from those of the quantizer 112 for producing output image data $y(i, j)$ for outputting; a subtracter 123 for subtracting the output data of the subtracter 121 from the output data of the quantizer 122; and the filter 124 for performing a predetermined filtering process on the output data of the subtracter 123 for outputting to the subtracter 121. In the figure, $e_b(i, j)$ represents a quantization error produced through quantization at the quantizer 122. Therefore, the output data of the subtracter 123 is quantization error $e_b(i,j)$. The filter 124 is a sort of linear filter. The transfer function thereof is determined to be $G_b(z_1, z_2)$.

Each of the error diffusion processing sections 110 and 120 is regarded as a two-dimensional sigma-delta modulation circuit. Accordingly, an expression (4) below is given for the relationship of input and output in the image processing apparatus shown in FIG. 14.

$$Y(z_1,z_2)=X(z_1,z_2)+H_a(z_1,z_2)E_a(z_1,z_2)+H_b(z_1,z_2)E_b(z_1,z_2) \quad (4)$$

In the expression (4), $Y(z_1, z_2)$, $X(z_1, z_2)$, $E_a(z_1, z_2)$ and $E_b(z_1, z_2)$ are values of z transformation of $y(i, j)$, $x(i, j)$, $e_a(i, j)$ and $e_b(i, j)$, respectively. Also, transfer functions $H_a(z_1, z_2)$ and $H_b(z_1, z_2)$ of the filters for modulating quantization errors $E_a(z_1, z_2)$ and $E_b(z_1, z_2)$ are given by the following expressions (5) and (6) below.

$$H_a(z_1,z_2)=1-G_a(z_1,z_2) \quad (5)$$

$$H_b(z_1,z_2)=1-G_b(z_1,z_2) \quad (6)$$

The transfer functions $H_a(z_1, z_2)$ and $H_b(z_1, z_2)$ indicate high-pass filters of two-dimensional finite impulse response (FIR). The high-pass. filters are filters for modulating quantization errors which determine modulation characteristics of quantization errors $E_a(z_1, z_2)$ and $E_b(z_1, z_2)$ to a higher frequency band. In the following description, filters indicated with transfer functions $H_a(z_1, z_2)$, $H_b(z_1, z_2)$, $G_a(z_1, z_2)$ and $G_b(z_1, z_2)$ are referred to as filters $H_a(z_1, z_2)$, $H_b(z_1, z_2)$, $G_a(z_1, z_2)$ and $G_b(z_1, z_2)$, respectively. $G_a(z_1, z_2)$ and $G_b(z_1, z_2)$ are given by expressions (7) and (8) below.

$$G_a(z_1,z_2)=\Sigma\Sigma g_a(n1,n2)z_1^{-n1}z_2^{-n2} \quad (7)$$

$$G_b(z_1,z_2)=\Sigma\Sigma g_b(n1,n2)z_1^{-n1}z_2^{-n2} \quad (8)$$

In the expression (7), the first $\Sigma$ indicates a sum when $n1$ is from $-N_3$ to $M_3$, and the second $\Sigma$ indicates a sum when $n2$ is from $-N_4$ to $M_4$. Similarly, in expression (8), the first $\Sigma$ indicates a sum when $n1$ is from $-N_5$ to $M_5$, and the second $\Sigma$ indicates a sum when $n2$ is from $-N_6$ to $M_6$. Each of $N_3$, $M_3$, $N_4$, $M_4$, $N_5$, $M_5$, $N_6$ and $M_6$ is a predetermined positive integer. Also, filter coefficients are given by $g_a(n1, n2)$ and $g_b(n1, n2)$ and target pixels by $n1=0$ and $n2=0$.

Qunatization levels of three or more of the quantizers 112 and 122 both include a minimum level and a maximum level of input image data $x(i, j)$ and quantization levels between the minimum and maximum levels. Quantization levels between the minimum and maximum levels of the quantizer 112 and those of the quantizer 122 are alternately set. In the comparative example, in particularly, quantization levels of three or more of the quantizer 122 are set to be suitable for obtaining output image data y(i, j) as a final output. Quantization levels of three or more of the quantizer 112 are set to be levels each between neighboring two of the quantization levels of the quantizer 122, the minimum level of the input image data x(i, j) and the maximum level of the input image data x(i, j).

Figure 15:
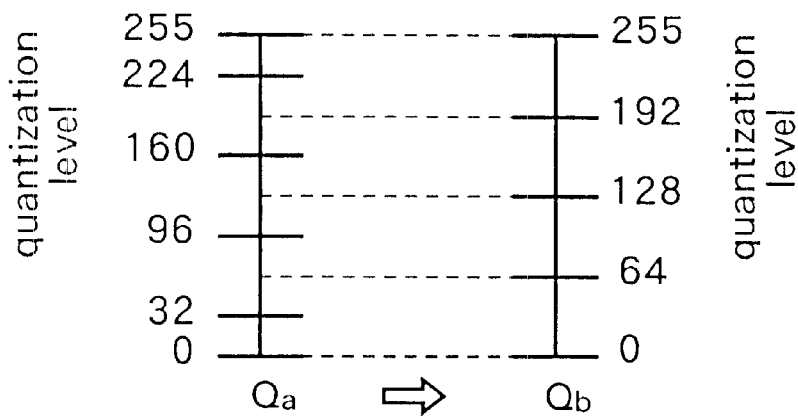
FIG. 15 is an illustration of examples of quantization levels of respective quantizers in FIG. 14.

FIG. 15 is an example of quantization levels of the quantizers 112 and 122. In the example, input image data x(i, j) has 256 levels of gradation values from '0' to '255'. In order to obtain final output image data y(i, j) of five values, quantization levels of the quantizer 122 are set to be '0', '64', '128', '192', and '255'. Quantization levels of the quantizer 112 are set to be levels each between neighboring two of the quantization levels of the quantizer 122, the minimum level of the input image data x(i, j) and the maximum level of the input image data x(i, j), that is '0', '32', '96', '160', '224' and '255'.

Characteristics are set to be different between error modulation filter $H_a(z_1, z_2)$ in the first error diffusion processing section 110 and filter $H_b(z_1, z_2)$ in the second error diffusion processing section 120. Particularly, it is preferable that error modulation filter $H_b(z_1, z_2)$ provides higher gains in a low frequency band than error modulation filter $H_a(z_1, z_2)$.

An operation of the image processing apparatus of the comparative example shown in FIG. 14 will now be described.

In the image processing apparatus of the comparative example, input image data x(i, j) is inputted to the first error diffusion processing section 110. Data outputted from the filter 114 is then subtracted from the input image data x(i, j) at the subtracter 111. Data outputted from the subtracter 111 is quantized at the quantizer 112. Data outputted from the quantizer 112 is then inputted to the second error diffusion processing section 120 as data output of the first error diffusion processing section 110. Data outputted from the subtracter 111 is subtracted from data outputted from the quantizer 112 at the subtracter 113. Quantization error $e_a(i, j)$ is thus produced. Quantization error $e_a(i, j)$ as data outputted from the subtracter 113 is inputted to the filter 114 where a filtering process represented by transfer function $G_a(z_1, z_2)$ is performed. Data outputted from the filter 114 is inputted to the subtracter 111. Through such an operation, quantization is performed at the first error diffusion processing section 110 on input image data x(i, j) based on quantization levels of three or more. Quantization error $e_a(i, j)$ produced through the quantization is then modulated to a higher frequency band. The error diffusion processing with quantization levels of three or more is thus performed on input image data x(i, j) for producing an output.

Data outputted from the first error diffusion processing section 110 is inputted to the second error diffusion processing section 120. Data outputted from the filter 124 is subtracted from the data outputted from the first error diffusion processing section 110 at the subtracter 121. Data outputted from the subtracter 121 is quantized at the quantizer 122. Data outputted from the quantizer 122 is produced as data outputted from the second error diffusion processing section 120, that is, data y(i, j) outputted from the image processing apparatus. Furthermore, the data outputted from the subtracter 121 is subtracted from the output data of the quantizer 122 at the subtracter 123 to produce quantization error $e_b(i, j)$. Quantization error $e_b(i, j)$ as data outputted from the subtracter 123 is then inputted to the filter 124 where a filtering process represented by transfer function $G_b(z_1, z_2)$ is performed. Data outputted from the filter 124 is inputted to the subtracter 121. Through such an operation, quantization is performed at the second error diffusion processing section 120 on the data outputted from the first error diffusion processing section 110 based on quantization levels of three or more. Quantization error $e_b(i, j)$ produced through the quantization is then modulated to a higher frequency band. The error diffusion processing with quantization levels of three or more is thus performed on the data outputted from the first error diffusion processing section 116 for producing an output.

As described so far, the image processing apparatus of comparative example provides the two-step error diffusion processing for input image data x(i, j) at the error diffusion processing sections 110 and 120 with the quantizers 112 and 122 and the filters 114 and 124 whose characteristics vary from each other. Image output data y(i, j) with reduced levels of gradation is finally obtained.

Figure 16:
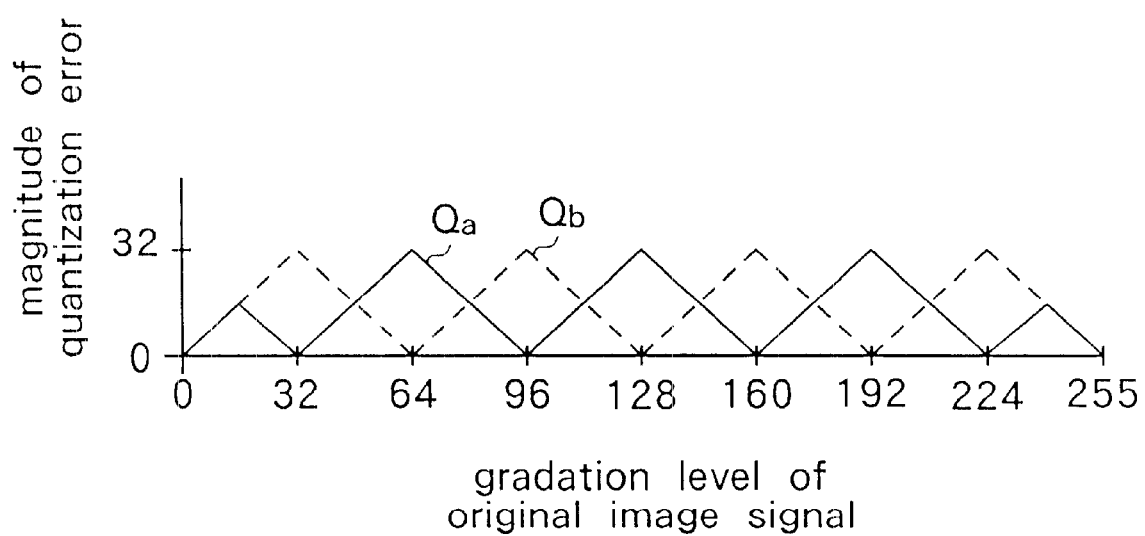
FIG. 16 is an illustration showing magnitudes of quantization errors produced in the respective quantizers when the quantization levels are set as shown in FIG. 15.

Effects of the image processing apparatus of comparative example will be described. FIG. 16 shows magnitudes of quantization errors produced at the quantizers 112 and 122 for gradation levels of input image data x(i, j) where quantization levels of the quantizers 112 and 122 are set shown in FIG. 15. In FIG. 16, a solid line shown with $Q_a$ indicates magnitudes of quantization errors produced at the quantizer 112. A broken line shown with $Q_b$ indicates magnitudes of quantization errors produced at the quantizer 122. As shown, the original quantization at the quantizer 122 does not produce errors near the quantization levels. Consequently, random patterns are not produced near the quantization levels. The quantizer 122 therefore performs quantization for selectively applying errors to a part where errors are not produced through quantization performed at the quantizer 122. Such a two-step quantization performed at the quantizers 112 and 122 achieves uniform quantization levels for all the gradation levels of the original image data.

A design of error modulation filters $H_a(z_1, z_2)$ and $H_b(z_1, z_2)$ in the error diffusion processing sections 110 and 120 will now be described. If filters with the same characteristics are used for $H_a(z_1, z_2)$ and $H_b(z_1, z_2)$, interference of frequencies occurs between quantization errors produced at the first stage and those at the second stage, according to an expression (4). The image quality thus deteriorates. It is therefore preferable that filters with different characteristics are used for $H_a(z_1, z_2)$ and $H_b(z_1, z_2)$. Since errors produced at the first stage are not uniform yet as shown in FIG. 15, a texture is not produced from filter $H_a(z_1, z_2)$ near the quantization levels of the quantizer 112. In contrast, quantization errors produced at the second stage are uniform and a texture produced from filter $H_b(z_1, z_2)$ is thus dominant over all the gradation levels of the original image data. Therefore, a uniform texture is achieved through designing such that filter $H_a(z_1, z_2)$ produces a fine texture and filter $H_b(z_1, z_2)$ produces a coarse texture. This owes to human visual perception more sensitive to a coarse texture. In order to allow filter $H_a(z_1, z_2)$ to produce a fine texture and filter $H_b(z_1, z_2)$ to produce a coarse texture, gains in a high frequency band are increased for filter $H_a(z_1, z_2)$ while gains in a low frequency band are increased for filter $H_b(z_a, z_2)$ compared to filter $H_a(z_1, z_2)$.

An expression (9) below is given for one example of a filter coefficient $g_a(i, j)$ of $G_a(z_1, z_2)$, and expression (10) is given for one example of a filter coefficient $g_b(i, j)$ of $G_b(z_1, z_2)$. The asterisk (*) in the expressions indicates a target pixel where $g_a(0, 0)=0$ and $g_b(0, 0)=0$.

$$ga(i,.j) := \begin{pmatrix} & * & 7 \\ 3 & 5 & 1 \end{pmatrix}_{/16} \qquad (9)$$

$$gb(i,j) := \begin{pmatrix} & & * & 7 & 5 \\ 3 & 5 & 7 & 5 & 3 \\ 1 & 3 & 5 & 3 & 1 \end{pmatrix}_{/48} \qquad (10)$$

Figure 17:
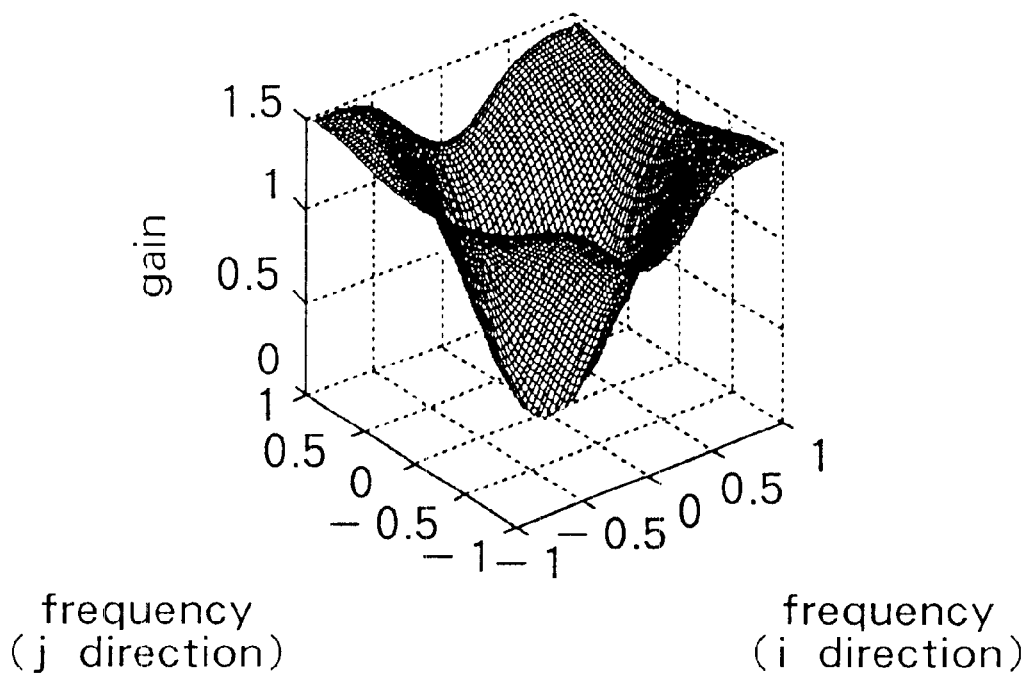
FIG. 17 is a plot for showing one example of frequency characteristic of a filter used in a first error diffusion processing section in FIG. 14.
Figure 18:
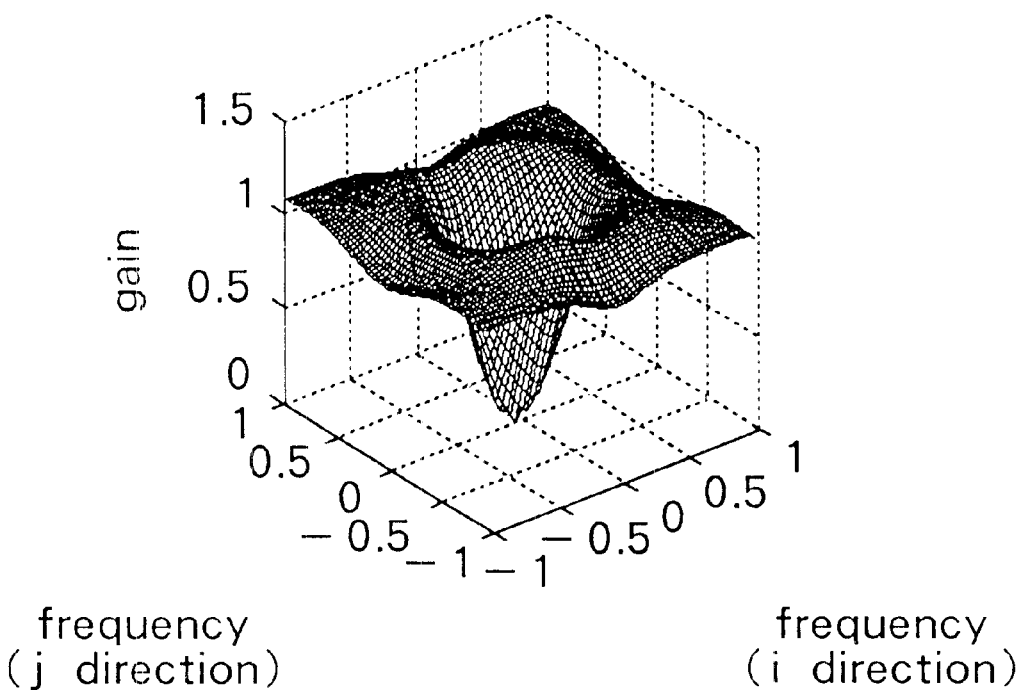
FIG. 18 is a plot for showing one example of frequency characteristic of a filter used in a second error diffusion processing section in FIG. 14.

FIG. 17 shows frequency characteristics of the error modulation filter $H_a(z_1, z_2)$ using filter $G_a(z_1, z_2)$ given by expression (9), and FIG. 18 shows frequency characteristics of the error modulation filter $H_b(z_1, z_2)$ using filter $G_b(z_1, z_2)$ given by expression (10). In FIGS. 17 and 18, a greater absolute value of numerical value representing frequency indicates a higher frequency. The filter $G_a(z_1, z_2)$ given by expression (9) and the filter $H_a(z_1, z_2)$ using this filter are called filters of Floyd & Steinberg (hereinafter referred to as Floyd's filter). The filter $G_b(z_1, z_2)$ given by expression (10) and the filter $H_b(z_1, z_2)$ using this filter are called filters of Jarvis, Judice & Ninke (hereinafter referred to as Jarvis' filter).

In the filter used for $H_b(z_1, z_2)$, the greater the gain in a high frequency band, the finer the texture becomes, while the lower the frequency band having a greater gain, the more coarse the texture becomes. However, when the gain in a high frequency band is great, the frequency characteristic approaches to the Floyd's filter using $H_a(z_1, (z_2))$, which results in occurrence of a slight interference. In contrast, when the band having a greater gain is low, the interference is suppressed, which results in a uniform texture. The finer and the more uniform the texture, the better the image quality. An optimum filter should be selected to be suitable for an output equipment or an output resolution as the filter used for $H_b(z_1, z_2)$. Also, the texture obtained in the image processing apparatus of comparative example becomes the texture of the filter used for $H_a(z_1, z_2)$ and the texture of the filter used for $H_b(z_1, z_2)$ superimposed to each other.

Thus, the image processing apparatus of comparative example achieves a high-quality image having a uniform texture and reduced roughness without pseudo contours and graininess.

However, the image processing apparatus of comparative example has the following two problems. The first problem is that dispersibility of dots or white dots in a highlight region (where dots are sparse) or in a shadow region (where dots are dense) deteriorates, which results in deterioration in image quality. The second problem is that the interference of the quantization errors produced in the first stage error diffusion processing and those produced in the second stage error diffusion processing (also referred to as interference of error modulation filters) causes image unevenness, which results in deterioration in image quality.

An image processing method and apparatus of the invention solves the above two problems.

Figure 1:
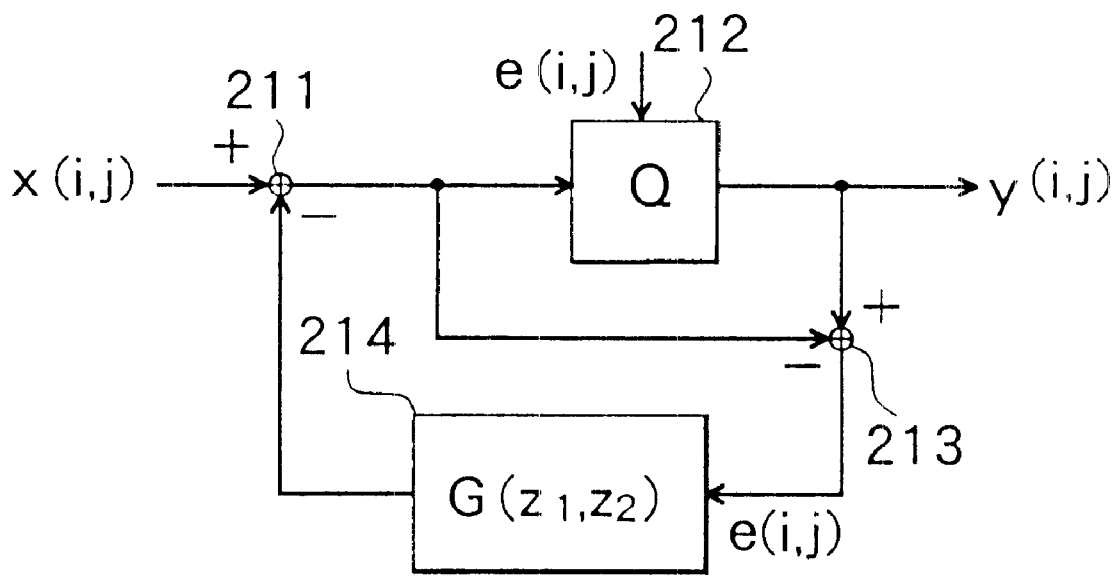
FIG. 1 is a block diagram showing a configuration of an image processing apparatus for implementing a, conventional error diffusion processing.
Figure 2:
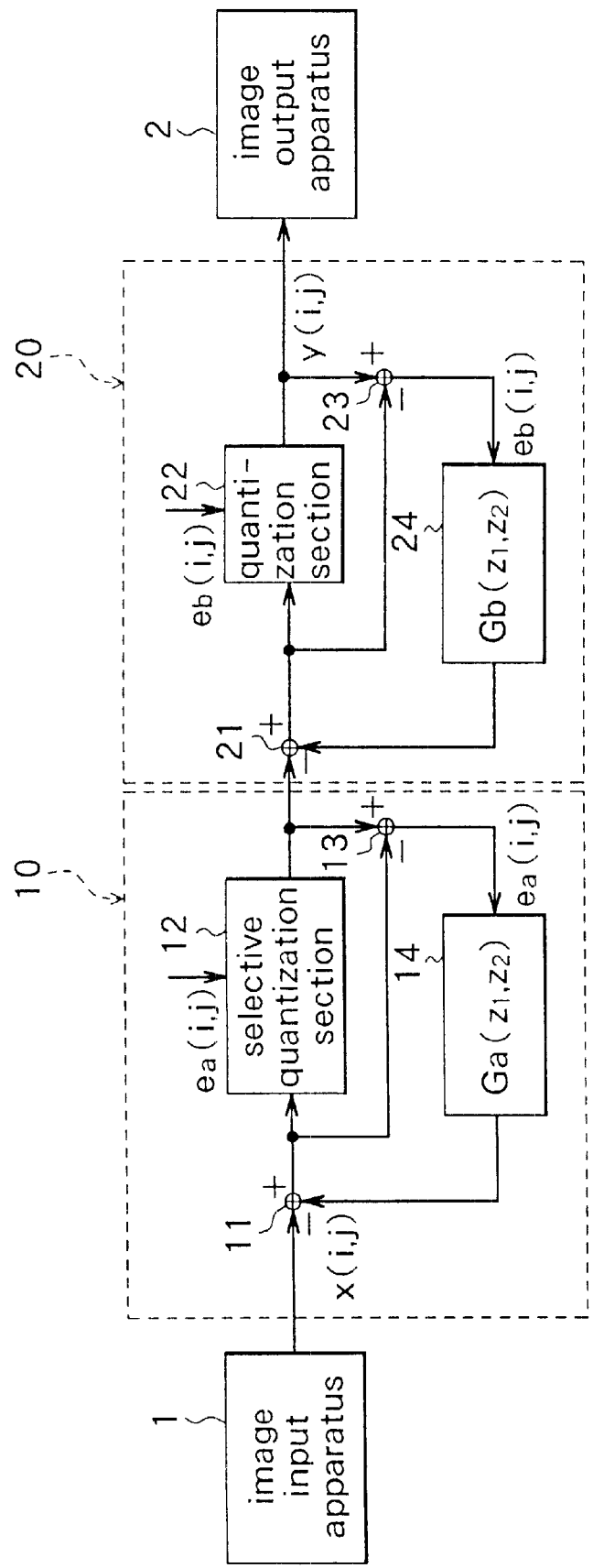
FIG. 2 is a block diagram showing a configuration of an image processing apparatus according to a first embodiment of the invention.

Next, an image processing method and an image processing apparatus according to a first embodiment of the invention will now be described. FIG. 2 is a block diagram showing a configuration of an image processing apparatus for implementing an image processing method of the first embodiment. The image processing apparatus comprises: a first error diffusion processing section 10 for performing a selective error diffusion process on input image data x(i, j) according to its gradation value for producing an output; and a second error processing section 20 for performing an error diffusion process having quantization levels of three or more on the output data of the first error diffusion processing section 10 for outputting as output image data y(i, j).

The first error diffusion processing section 10 comprises: a subtracter 11 for subtracting output data of a filter 14 described below from input image data x(i, j); a selective quantization section 12 for quantizing output data of the subtracter 11 for each pixel to convert the quantized output data to image data having a predetermined quantization level for producing an output, when the gradation value of the output data of the subtracter 11 is within a predetermined quantization-executable range, and for outputting the output data of the subtracter 11 without quantization when the gradation value of the output data of the subtracter 11 is not within the predetermined quantization-executable range; a subtracter 13 for subtracting the output data of the subtracter 11 from the output data of the selective quantization section 12; and the filter 14 for performing a predetermined filtering process on the output data of the subtracter 13 for outputting to the subtracter 11. The output data of the selective quantization section 12 is outputted to the second error diffusion processing section 20 as the output data of the first error diffusion processing section 10. The filter 14 and the subtracter 11 correspond to first error diffusing means for multiplying quantization error $e_a(i, j)$ of a target pixel produced through the quantization at the selective quantization section 12 with a predetermined weight coefficient to diffuse the same to input image data x(i, j) of an unquantized pixel near the target pixel. In the figure, $e_a(i, j)$ represents a quantization error produced through the quantization at the selective quantization section 12. Therefore, the output data of the subtracter 13 is quantization error $e_a(i, j)$. The filter 14 is a sort of linear filter. The transfer function thereof is set to be $G_a(z_1, z_2)$. The filter 14 is implemented by a digital filter, for example.

The second error diffusion processing section 20 comprises: a subtracter 21 for subtracting output data of a filter 24 described below from the output data of the first error diffusion processing section 10; a quantization section 22 for quantizing the output data of the subtracter 21 based on quantization levels of three or more including quantization levels different from those of the selective quantization section 12 for outputting as output data y(i, j); a subtracter 23 for subtracting the output data of the subtracter 21 from the output data of the quantization section 22; and the filter 24 for performing a predetermined filtering process on the output data of the subtracter 23 for outputting to the subtracter 21. The filter 24 and the subtracter 21 correspond to second error diffusing means for multiplying quantization error $e_b(i, j)$ of the target pixel produced through the quantization at the quantization section 22 with a predetermined weight coefficient to diffuse the same to image data of an unquantized pixel near the target pixel. In the figure, $e_b(i, j)$ represents a quantization error produced through the quantization at the quantization section 22. Therefore, the output data of the subtracter 23 is quantization error $e_b(i, j)$. The filter 24 is a sort of linear filter. The transfer function thereof is set to be $G_b(z_1, z_2)$. The filter 24 is implemented by a digital filter, for example.

Characteristics are set to be different between error modulation filter $H_a(z_1, z_2)$ in the first error diffusion processing section 10 and $H_b(z_1, z_2)$ in the second error diffusion processing section 20. In this case, it is preferable that the error modulation filter $H_b(z_1, z_2)$ provides higher gains in a low frequency band than the error modulation filter $H_a(z_1, z_2)$.

Image input data x(i, j) inputted to the image processing apparatus is given by an image input apparatus 1, for example, and output image data y(i, j) outputted from the image processing apparatus is outputted to an image output apparatus 2, for example. The image input apparatus 1 may be any of an image scanner, a digital camera, a video camera and so on. The image output apparatus 2 may be any of a printer, a liquid crystal display and so on.

The image processing apparatus of the embodiment may be either provided as a single unit or incorporated in an image output apparatus such as a printer in a form of IC (integrated circuit) and the like.

Figure 3:
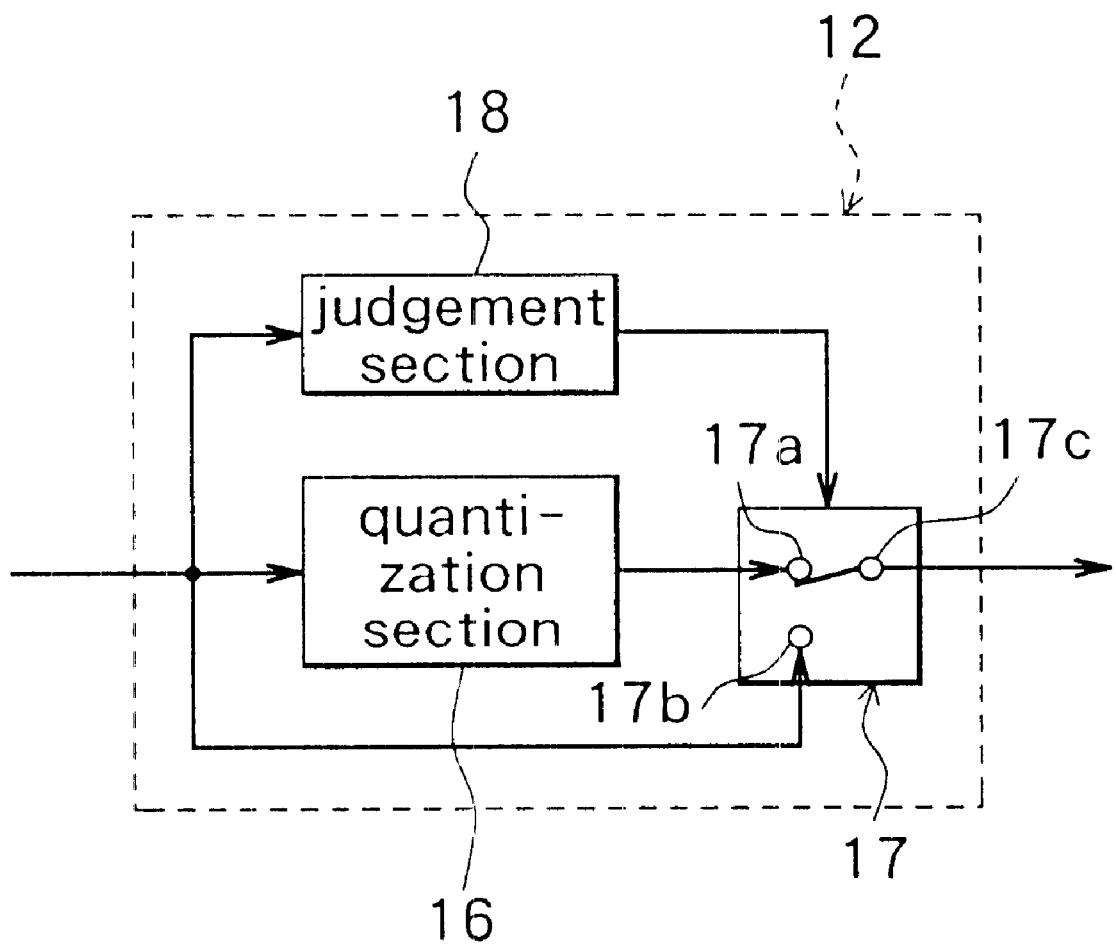
FIG. 3 is a block diagram showing one example of a selective quantization section in FIG. 2.

FIG. 3 is a block diagram showing one example of a configuration of the selective quantization section 12. The selective quantization section 12 comprises: a quantization section 16 for quantizing the output data of the subtracter 11 for each pixel to convert the same to image data having a predetermined quantization level for outputting; and a switch 17, one contact 17a of fixed contacts of which is inputted with the output data of the quantization section 16. To the other contact 17b of the fixed contacts of the switch 17, the output data of the subtracter 11 is inputted. The quantization section 12 also includes a judgement section 18 for judging whether or not the gradation value of the output data of the subtracter 11 is within a predetermined quantization-executable range to control the switch 17 so as to connect a movable contact 17c of the switch 17 to the fixed contact 17a when the gradation value of the output data of the subtracter 11 is within the predetermined quantization-executable range and to connect the movable contact 17c of the switch 17 to the fixed contact 17b when the gradation value of the output data of the subtracter 11 is not within the predetermined quantization-executable range. The output data from the movable contact 17c of the switch 17 is the output data of the selective quantization section 12.

An operation of the image processing apparatus of the embodiment will now be described. The description applies to the image processing method of the embodiment as well.

In the image processing apparatus of the embodiment, input image data x(i, j) is inputted to the first error diffusion processing section 10 and the output data of the filter 14 is subtracted from input image data x(i, j) by the subtracter 11. The output data of the subtracter 11 is inputted to the selective quantization section 12 where the output data of the subtracter 11 is quantized for each pixel to be converted to image data having a predetermined quantization level for outputting when the gradation value of the output data of the subtracter 11 is within a predetermined quantization-executable range and the output data of the subtracter 11 is outputted without quantization when the gradation value of the output data of the subtracter 11 is not within the predetermined quantization-executable range. The output data of the selective quantization section 12 is inputted to the second error diffusion processing section 20 as the output data of the first error diffusion processing section 10. The output data of the subtracter 11 is subtracted from the output data of the selective quantization section 12 so that quantization error $e_a(i, j)$ is produced. Quantization error $e_a(i, j)$ which is the output data of the subtracter 13 is inputted to the filter 14 where a filtering process represented by transfer function $G_a(z_1, z_2)$ is performed. The output data of the filter 14 is inputted to the subtracter 11. According to such an operation, the first error diffusion processing section 10 quantizes the output data of the subtracter 11 selectively in accordance with input image data x (i, j), that is, the gradation value of the output data of the subtracter 11 and performs a diffusing process for diffusing the quantization error of a target pixel produced through quantization to input image data x (i, j) of an unquantized pixel near the target pixel.

The output data of the first error diffusion processing section 10 is inputted to the second error diffusion processing section 20 where the output data of the filter 24 is subtracted from the output data of the first error diffusion processing section 10 by the subtracter 21. The output data of the subtracter 21 is quantized by the quantization section 22 and the output data of the quantization section 22 is outputted as the output data of the second error diffusion processing section 20, that is, output image data y(i, j) of the image processing apparatus. The output data of the subtracter 21 is subtracted from the output data of the quantization section 22 by the subtracter 23 so that quantization error $e_b(i, j)$ is produced. The quantization error $e_b(i, j)$ which is the output data of the subtracter 23 is inputted to the filter 24 where a filtering process represented by transfer function $G_b(z_1, z_2)$ is performed on the quantization error $e_b(i, j)$, and the output data of the filter 24 is inputted to the subtracter 21. According to such an operation, the second error diffusion processing section 20 performs an error diffusing process for quantizing the output of the first error diffusion processing section 10 for each pixel to convert the same to output image data y(i, j) having one of quantizaiton levels of three or more including quntization levels different from those of the selective quantization section 12 for producing an output and for diffusing the quantization error of the target pixel produced through quantization at the quantization section 22 to image data of an unquantized pixel near the target pixel.

Figure 4:
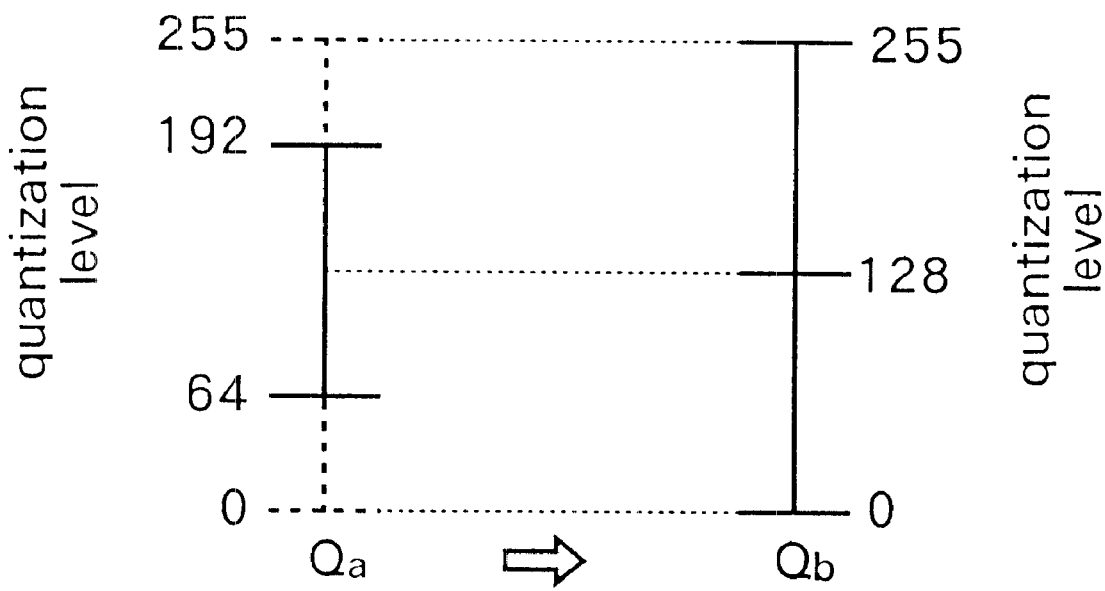
FIG. 4 is an illustration of one example of respective quantization levels for the selective quantization section and a quantization section in FIG. 2.

FIG. 4 shows one example of respective quantization levels in the selective quantization section 12 (shown as $Q_a$ in the figure) and the quantization section 22 (shown as $Q_b$ in the figure). In this example, input image data x(i, j) has 256 levels of gradation from '0' to '255'. In order to obtain a final output image data y(i, j) of three values, the respective quantization levels of the quantization section 22 are set to be '0', '128' and '255'. The respective quantization levels of the selective quantization section 12 are set to be intermediate values of the respective quantization levels of the quantization section 22, i.e., '64' and '192'. In the example, the quantization-executable range becomes gradation values '64' to '192'. The selective quantization section 12 quantizes the output data of the subtracter 11 using gradation values '64' and '192' of both ends of the quantization-executable range as quantization levels when the input image data x(i, j) where errors are diffused, that is, the output data of the subtracter 11, is within the quantization-executable range to convert the same to image data having one of the quantization levels '64' and '192' for producing an output and to output the output data of the subtracter 11 as it is when the output data of the subtracter 11 is not within the quantization-executable range.

According to the image processing method or apparatus of the embodiment, in the selective quantization section 12, such a quantization is performed that errors are supplemented selectively at a center of a portion where no error is produced through the quantization at the quantization section 22 like the image processing method or apparatus of comparative example. Therefore, quantization errors are made uniform for all gradations of original image data so that a high-quality image having a uniform texture and reduced roughness without pseudo contours and graininess can be obtained.

Figure 5:
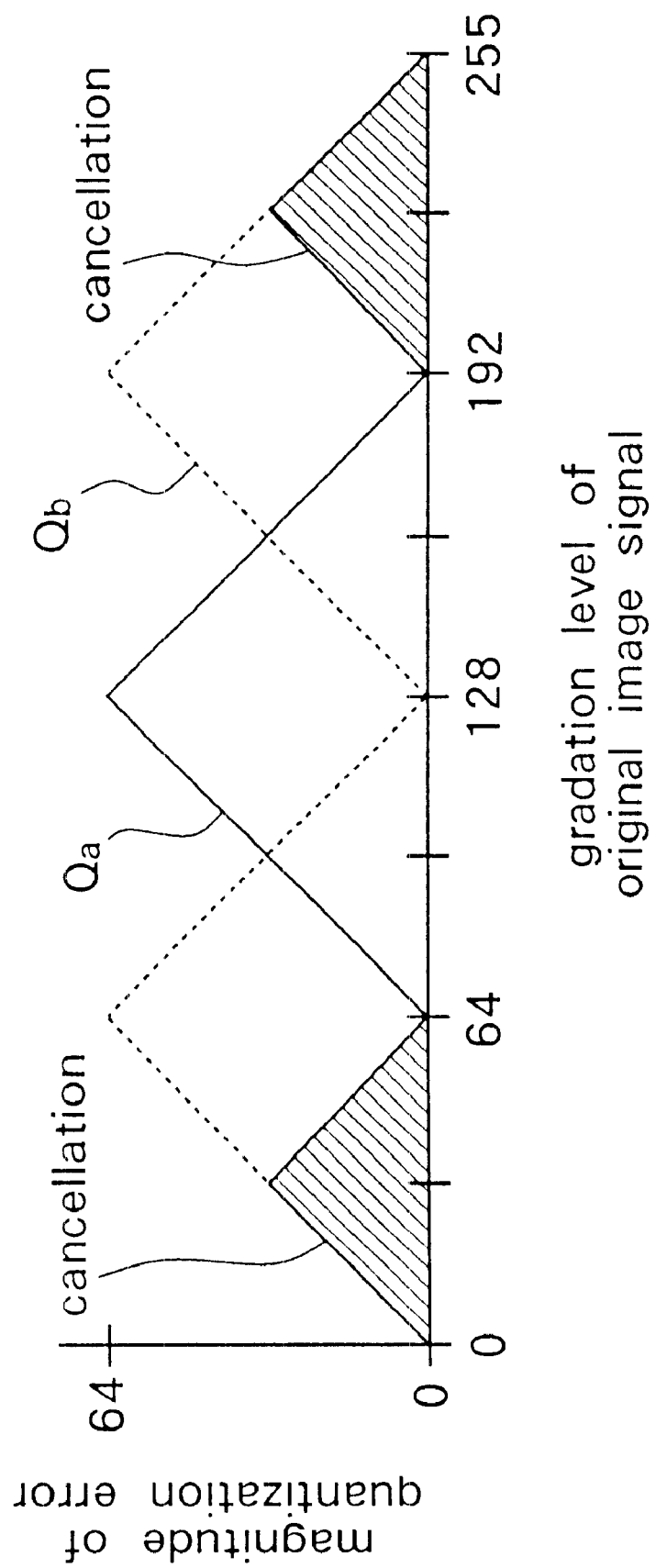
FIG. 5 is an illustration of magnitudes of quantization errors produced in the selective quantization section and the quantization section when the quantization levels are set as shown in FIG. 4.

Here, the problem that the dispersibility of dots (herein including white dots) in the highlight region and the shadow region is poor in the image processing apparatus of the comparative example shown in FIG. 14 is considered. In the image processing apparatus of comparative example, when it is assumed that the respective quantization levels of the quantizer 122 are set to be '0', '128' and '256' and the respective quantization levels of the quantizer 112 are set to be '0', '64', '192' and '255' in order to obtain the final output image data y(i, j) of three values, magnitudes produced at the quantizers 112 and 122 for the respective gradations of input image data x (i, j) are made as shown by a solid line denoted with $Q_a$ and a broken line denoted with $Q_b$, respectively, in FIG. 5. With comparison of FIG. 5 to FIG. 16, it is first understood that magnitude of quantization error is increased due to change of the number of the final quantization levels from five to three. Further, magnitudes of errors superimposed on both end portions of the gradations shown with slanting lines in FIG. 5 are increased and the range where the errors are superimposed spreads by the quantizer 112. Since the highlight region and the shadow region are included in the regions shown with the slanting lines, the errors in the slanting line regions inversely affect the dispersibility of dots. However, each slanting line region is not originally a region where pseudo contours occur due to texture change (the region where a pseudo contour occurs due to texture change is a region surrounding a gradation value of '128'), and the errors in each slanting line region do not serve. Accordingly, in order to improve dispersibility of dots in the highlight region and the shadow region, the errors in each slanting line region should be prevented from occurring. In the first stage error diffusion processing step, the improvement can be realized by preventing the both end portions of the gradations corresponding to the slanting line portions from being quantized.

In view of the above, according to the image processing apparatus of the invention, in the selective quantization section 12 of the first error diffusion processing section 10, the output data of the subtracter 11 is quantized for each pixel to be converted to image data having one of quantization levels '64' and '192' when the gradation value of the output data of the subtracter 11 is within the quantization-executable range '64' to '192', it is outputted without quantization when the value is not within the quantization-executable range. Thereby, it is possible to improve the dispersibility of dots in the highlight region and the shadow region and enhance the image quality. In this case, the quantization errors generated at the selective quantization section 12 are represented in FIG. 5 with a portion where the slanting line portion is subtracted from a portion shown with a solid line denoted by symbol $Q_a$. Also, the quantization errors generated at the quantization section 22 is represented by a broken line denoted with symbol $Q_b$, in FIG. 5.

Figure 6:
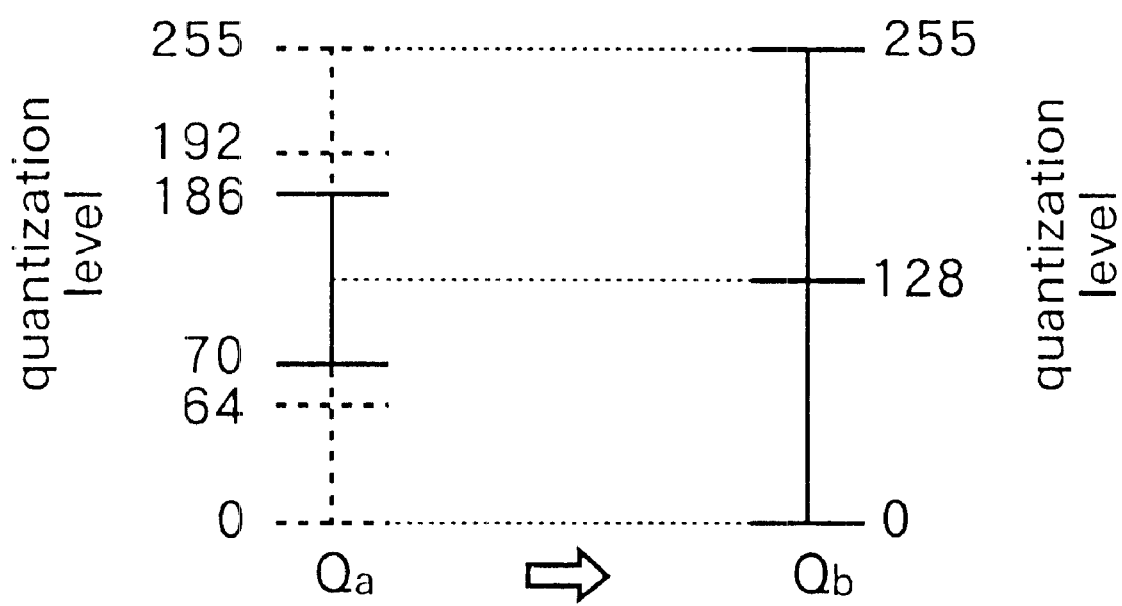
FIG. 6 is an illustration of another example of respective quantization levels for the selective quantization section and the quantization section in FIG. 2.

Here, the problem that image unevenness due to the interference between the error modulation filters is conspicuous in the image processing apparatus of the comparative example shown in FIG. 14 is considered. When the number of the final quantization levels is three (the quantization levels are '0', '128' and '255'), the minimum quantization level '0' and the maximum quantization level '255' are used if it is tried to generate a random pattern about an intermediate quantization level '128' for preventing a pseudo contour due to texture change from occurring. Thereby, the dynamics of the random pattern is increased around the intermediate quantization level, which results in that the image unevenness due to interference between filters is much emphasized. In order to relax this problem, a ratio of the minimum quantization level and the maximum level in the random pattern in the vicinity of the intermediate quantization level must be reduced. This can be realized by slightly shifting the quantization level in the selective quantization section 12 to reduce the quantization-executable range slightly, as shown in FIG. 6. Thus, a ratio of pixels quantized to the intermediate quantization level '128' at the second stage error diffusion processing step is largely increases so that the dynamics of the random pattern can be decreased.

In the image processing method and apparatus of the embodiment, it is preferable that the gradation values at both ends of the quantization-executable range are set to be values close to the quantization level '128' of the second diffusion processing section 20 included within the quantization-executable range rather than central values '64' and '192' between the quantization level '128' of the second diffusion processing section 20 included within the quantization-executable range and the quantization levels '0' and '255' of the second error diffusion processing section 20 adjacent thereto.

FIG. 6 shows one example of respective quantization levels in the selective quantization section 12 (shown as $Q_a$) and the quantization section 22 (shown as $Q_b$) when the gradation levels are set in the above manner. In this example, input image data x(i, j) has 256 levels of gradation values from '0' to '255'. In order to obtain output image data y(i, j) of three levels as a final output, respective,quantization levels of the quantization section 22 are set to be '0', '128' and '255'. Quantization levels of the selective quantization section 12 are set to be '70' and '186'. In the example, the quantization-executable range corresponds to gradation values '70' to '186', and the selective quantization section 12 quantizes the output data of the subtracter 11 using the gradation values '70' and '186' at both ends of the quantization-executable range as quantization levels to convert the quantized data to image data having one of the quantization levels '70' and '186' for outputting when the input image data x(i, j) where errors are diffused, that is, the output data of the subtracter 11 is within the quantization-executable range, and outputs the output data of the subtracter 11 as it is when the output data of the subtracter 11 is not within the quantization-executable range.

Figure 7:
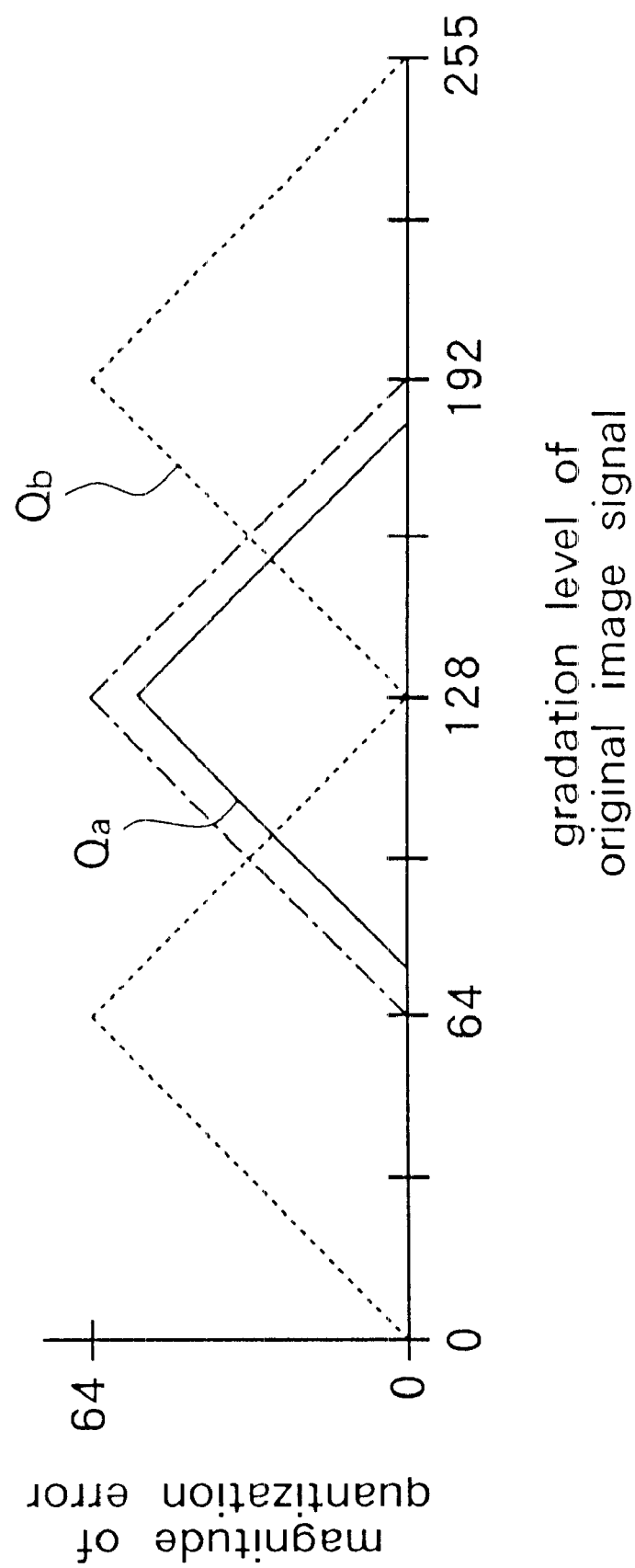
FIG. 7 is an illustration of magnitudes of quantization errors produced in the selective quantization section and the quantization section when the quantization levels are set as shown in FIG. 6.

When the quantization levels are set as set forth above, magnitudes of the quantization errors produced at the selective quantization section 12 and the quantization section 22 are shown with a solid line with $Q_a$ and a broken line with $Q_b$, respectively, in FIG. 7. As understood from FIG. 7, the magnitudes of the errors produced through the selective quantization section 12 can be varied by changing a shifting amount of the quantization level in the selective quantization section 12, so that the dynamics of random pattern superimposed in the first stage of error diffusion processing can be controlled. It is to be noted that when the shifting amount is set too large, the random pattern disappears and therby effects of the second stage of error diffusion processing are cancelled.

Thus, the gradation values at both ends of the quantization-executable range-in the selective quantization section 12 of the first error diffusion processing section 10 are set to be values close to the quantization level of the second diffusion processing section 20 included within the quantization-executable range rather than central values between the quantization level of the second error diffusion processing section 20 included within the quantization-executable range and the quantization levels of the second error diffusion processing section 20 adjacent thereto so that the dynamics of random pattern can be made small. As a result, image unevenness due to interference between the error modulation filters can be reduced and the image quality obtained can be improved.s Next, frequency characteristics of the error modulation filter in the embodiment are considered. In the embodiment, for the first stage error modulation filter $H_a (z_1, z_2)$ and the second stage error modulation filter $H_b (z_1, z_2)$, Floyd's filter having frequency characteristic shown in FIG. 17 and Jarvis' filter having frequency characteristic shown in FIG. 18 can be used, respectively. However, in order to reduce image unevenness due to interference between filters, improved filters are preferably used as described below.

Figure 8:
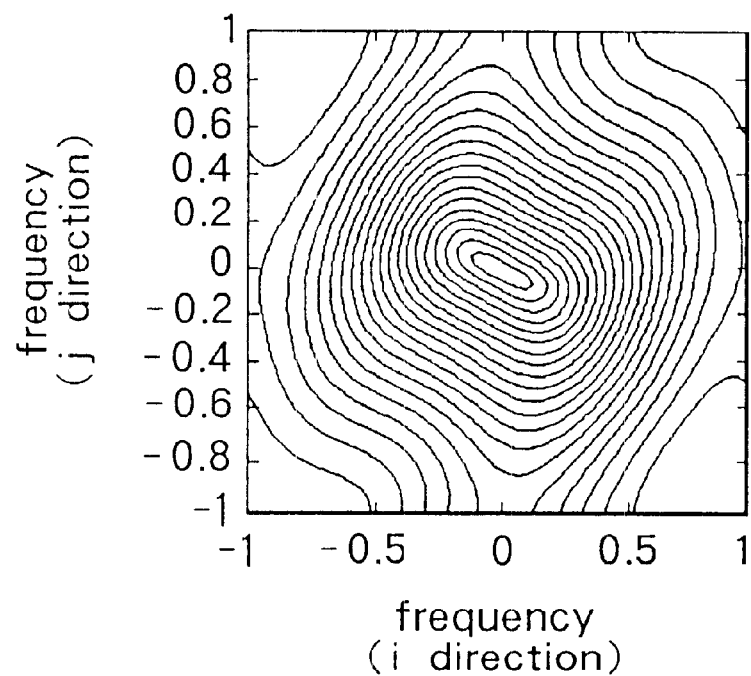
FIG. 8 is an illustration of frequency characteristic of the Floyd's filter represented by contour lines.
Figure 9:
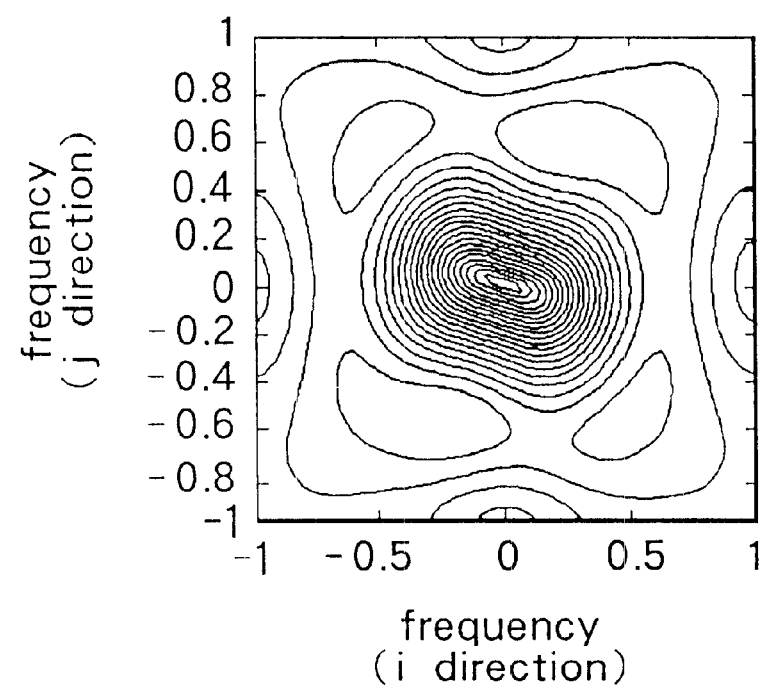
FIG. 9 is an illustration of frequency characteristic of the Jarvis' filter represented by contour lines.

The problem about the image unevenness due to the interference between the error modulation filters is first considered in view of the frequency characteristics of filters. FIGS. 8 and 9 show frequency characteristic of Floyd's filter shown in FIG. 17 and frequency characteristic of Jarvis' filter shown in FIG. 18 represented with contour lines, respectively. Through such representations, spatial shapes (characteristics) of frequency characteristics of the filters can well be understood. Referring to FIGS. 17, 18, 8 and 9, causes of image unevenness due to interference of filters are considered. In order to prevent the interference it is desirable that the filter $H_a (z_1, z_2)$ and the filter $H_b (z_1, z_2)$ are not superimposed to each other in their bands having large gains. However, it is understood that the gain of Jarvis' filter serving as $H_b (z_1, z_2)$ is considerably large in an band where the gain of Floyd's filter serving as $H_a (z_1, z_1,)$ is large. Regarding the spatial shapes (contour line shapes) of the frequency characteristics, it is understood that Floyd's filter serving as $H_a (z_1, z_2)$ and Jarvis' filter serving as $H_b (z_1, z_2)$ are considerably different from each other and there are directions which cause interference and directions which do not cause interference. Accordingly, in order to reduce image unevenness due to interference of filters, the following two points should be improved.

The first point is that a high gain band of the filter $H_b (z_1, z_2)$ is slightly shifted to its lower gain band side so as to suppress the interference between the filter $H_a (z_1, z_2)$ and the filter $H_b (z_1, z_2)$. The second point is that the spatial shapes (contour line shapes) of frequency characteristics of the filter $H_a (z_1, z_2)$ and the filter $H_b (z_1, z_2)$ are matched with each other to suppress interference of filters in all directions.

When the high gain band of the filter $H_a (z_1, z_2)$ is shifted to the lower gain band side, texture in the output image becomes coarse. However, in a case that the resolution is 720 DPI (dot per inch) or so, the texture is not conspicuous. Therefore, no problem occurs unless the frequency characteristic is greatly changed.

Filter coefficients $g_a (i, j)$ and $g_b (i, j)$ of filters $G_a (z_1, z_2)$ and $G_b (z_1, z_2)$ corresponding to the filter $H_a (z_1, z_2)$ and the filter $H_b (z_1, z_2)$ improved based upon the above are given as the following expressions (11) and (12). The asterisk (*) in the expressions represents a target pixel where $g_a (0, 0)=0$, and $g_b (0, 0)=0$.

$$g_a(i, j): \begin{pmatrix} * & 5 \\ 2 & 5 & 2 \end{pmatrix}_{/14} \quad (11)$$

$$g_b(i, j): \begin{pmatrix} * & 3 & 5 \\ 3 & 4 & 3 & 4 & 3 \\ 1 & 3 & 5 & 3 & 1 \end{pmatrix}_{/38} \quad (12)$$

Figure 10:
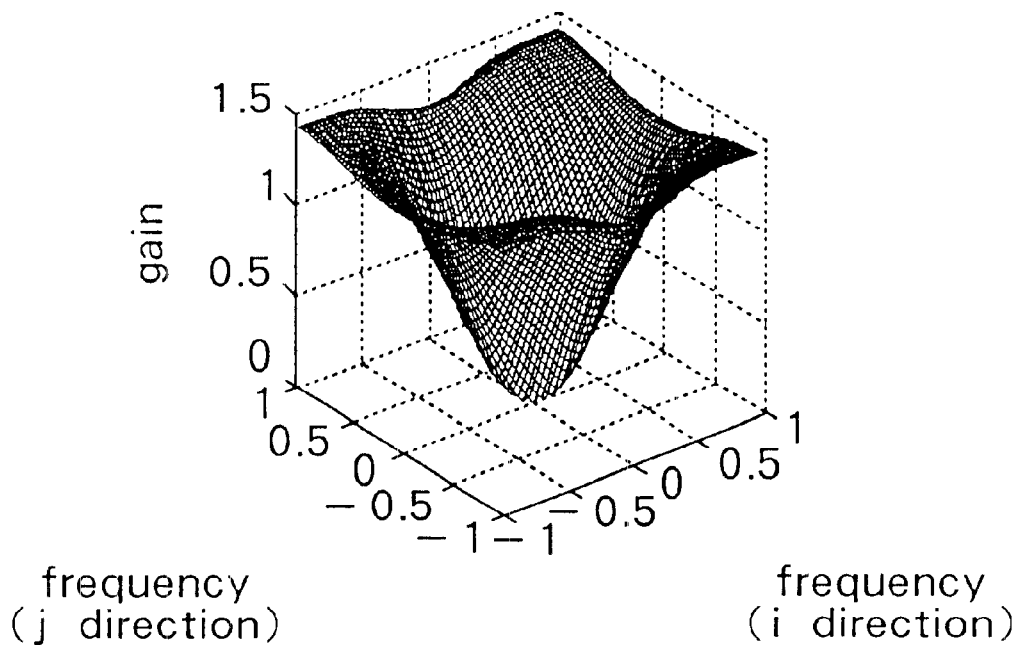
FIG. 10 is a plot for showing one example of frequency characteristic of a filter used in the selective quantization section in FIG. 2.
Figure 11:
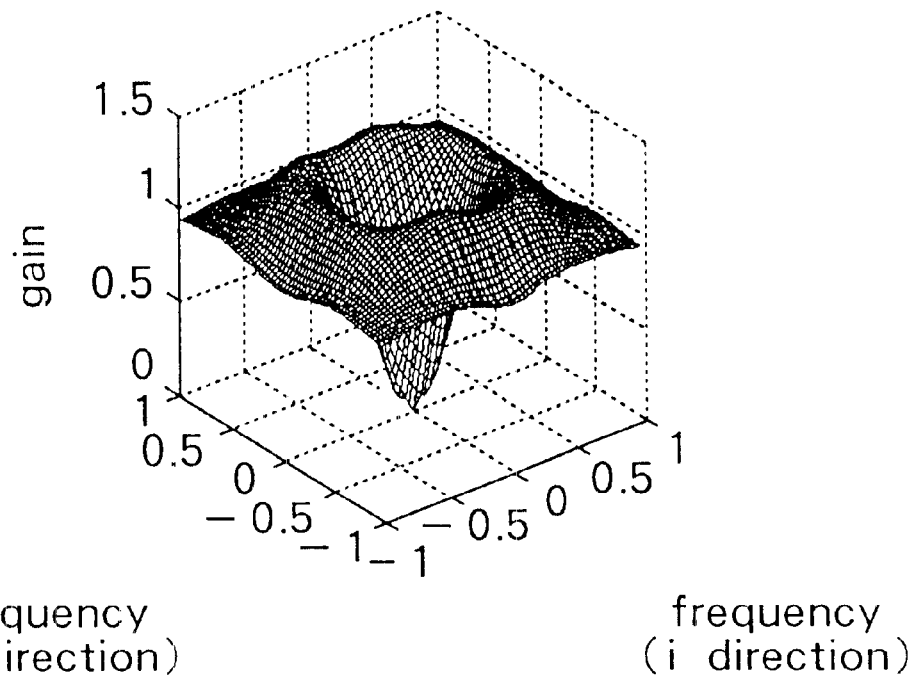
FIG. 11 is a plot for showing one example of frequency characteristic of a filter used in the quantization section in FIG. 2.
Figure 12:
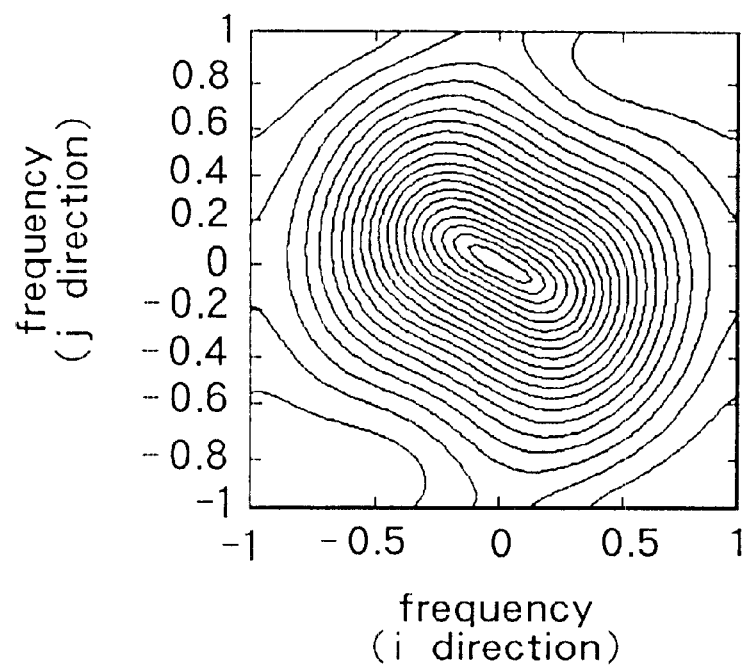
FIG. 12 is an illustration representing the frequency characteristic shown in FIG. 10 with contour lines.
Figure 13:
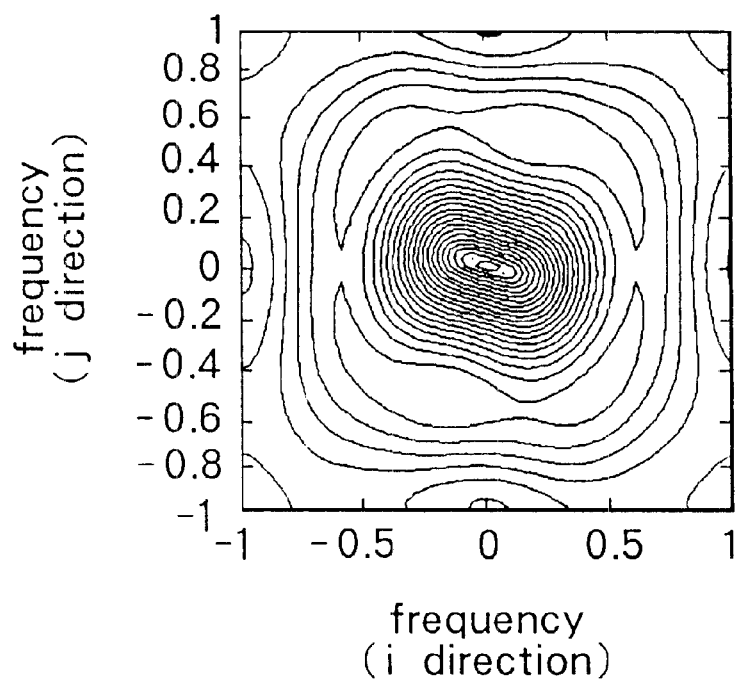
FIG. 13 is an illustration representing the frequency characteristic shown in FIG. 11 with contour lines.

FIG. 10 shows frequency characteristic of the error modulation filter $H_a (z_1, z_2)$ using the filter $G_a (z_1, z_2)$ represented by an expression (11) and FIG. 11 shows frequency characteristic of the error modulation filter $H_b (z_1, z_2)$ using the filter $G_b (z_1, (z_2)$ represented by an expression (12). FIGS. 12 and 13 represent frequency characteristics shown in FIGS. 10 and 11 with contour lines.

Referring to FIGS. 10 to 13, it is understood that the gains of the filter $H_b (z_1, z_2)$ are reduced in the band where the gains of the filter $H_a (z_1, z_2)$ are high. The filter $H_b (z_1, z_2)$ has higher gains in a low frequency band than those of the filter $H_a (z_1, z_2)$. As to the spatial shapes of frequency characteristics, it is understood that the shapes of the filter $H_a (z_1, z_2)$ and the filter $H_b (z_1, z_2)$ match with each other, particularly, in high frequency bands. Through using the filters thus improved as the filters $H_a (z_1, z_2)$ and $H_b (z_1, z_2)$, the image unevenness due to the interference between filters can be reduced and, in addition to improvement in quantization process of the first stage of error diffusion processing, the image unevenness can be decreased up to the extend where it is hardly conspicuous.

As described above, according to the image processing apparatus and method of the embodiment, the quantization in the first stage of error diffusion processing is performed so as to supplement quantization errors selectively centering a portion where no error is produced through the quantization in the second stage of error diffusion processing. Accordingly, the quantization errors are made uniform for all the gradation levels of the original image data so that a high-quality image having a uniform texture and reduced roughness can be obtained without pseudo contours and graininess.

In the embodiment, the modulation characteristics for quantization errors are different between the first and second stages of error diffusion processing. As a result, interference is prevented between quantization errors produced in the first stage of error diffusion processing and those produced in the second stage thereof so that a high-quality image can be obtained. Particularly, in the embodiment, the modulation characteristic for quantization errors of the second stage of error diffusion processing is set so that gains are higher in a low frequency band, compared to the first stage. An image with a more uniform texture can thus obtained.

In the embodiment, since portions at both ends of gradation levels are not quantized, the dispersibility of dots in the highlight and shadow regions is improved so that the image quality can be enhanced.

In the embodiment , further, the quantization-executable range is made small so that the image unevenness due to the interference between filters is reduced, thereby enhancing the image quality.

In the embodiment, also, the error modulation filters are improved so that the image unevenness due to the interference between filters is reduced, thereby enhancing the image quality.

It is to be noted that processing time is not increased in the image processing method and apparatus of the embodiment, as compared to the image processing method and apparatus of a comparative example.

Figure 19:
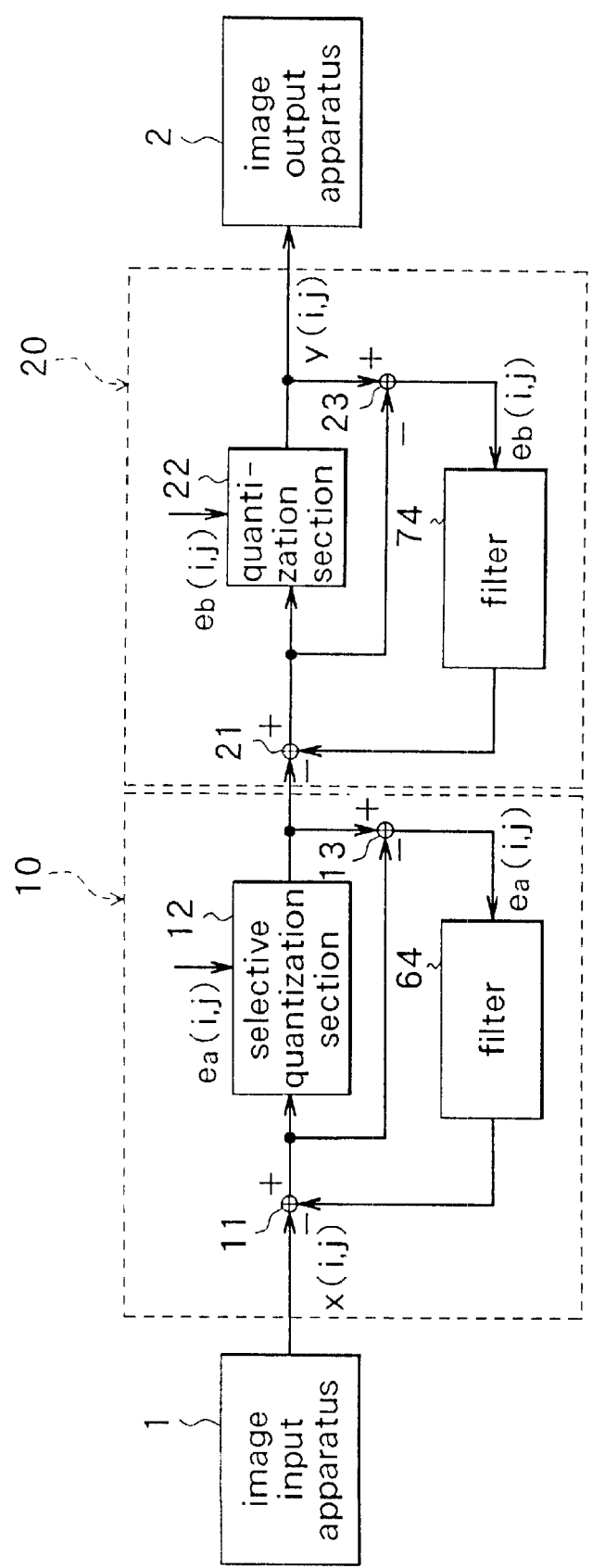
FIG. 19 is a block diagram showing a configuration of an image processing apparatus according to a second embodiment of the invention.

FIG. 19 is a block diagram showing a configuration of an image processing apparatus for implementing an image processing method of a second embodiment of the invention. The second embodiment is an example using mean error minimization method instead of the error diffusion method. The image processing apparatus of the second embodiment is provided with a filter 64 for the mean error minimization method in place of the filter 14 of the first embodiment and a filter 74 for the mean error minimization method in place of the filter 24 of the first embodiment. The filters 64 and 74 retain quantization errors $e_a (i, j)$ and $e_b (i, j)$ resulting from a plurality of quantized pixels near a target pixel and calculate mean errors by assigning respective predetermined weights to the quantization errors $e_a$ (i, j) and $e_b$ (i, j) and averaging the errors. The filters 64 and 74 output the mean errors when the image data of the target pixel is inputted. Such processing is equal to diffusing the quantization error resulting from a target pixel into input image data of unquantized pixels near the target pixel. Each of the filters 64 and 74 may be implemented by a digital filter.

The remainder of configuration, operation and effects of the second embodiment are similar to those of the first embodiment.

Figure 20:
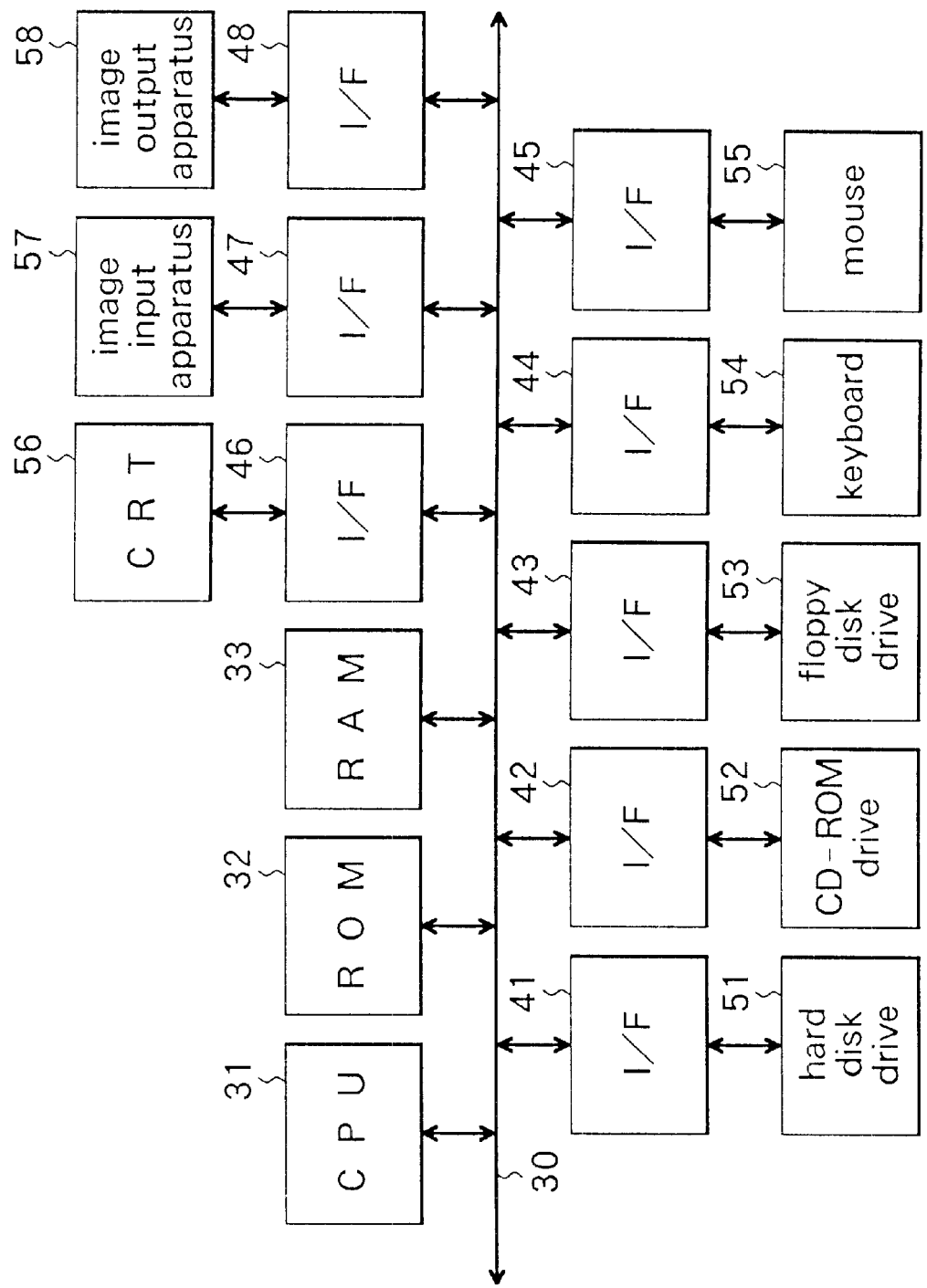
FIG. 20 is a block diagram showing a configuration of an image processing apparatus according to a third embodiment of the invention.

FIG. 20 is a block diagram showing a configuration of an image processing apparatus of a third embodiment of the invention. The embodiment is an example of implementation of functions similar to those of the image processing apparatus of the first embodiment in a form of software using a computer.

The image processing apparatus of the embodiment using a computer comprised a central processing unit (CPU) 31, a read only memory (ROM) 32 and random access memory (RAM) 33, interconnected to one another through a bus 30. The image processing apparatus further comprises a hard disk drive 51, a CD (compact disk)-ROM drive 52 a floppy disk drive 53, a keyboard 54, a mouse 55 and a cathode-ray tube (CRT) 56, each connected to the bus 30 through interfaces 41 to 46. The image processing apparatus further comprises an interface 47 for connecting an image input apparatus 57 to the bus 30 and an interface 48 for connecting an image output apparatus 58 to the bus 30.

The image input apparatus 57 may be any of an image scanner, a digital camera, a video camera and so on. The image output apparatus 58 may be any of a printer, a liquid crystal display and so on.

In the image processing apparatus of the embodiment, the CPU 31 performs the function of the image processing apparatus shown in FIG. 2, through executing an application program stored on any of the hard disk in the hard disk drive 51, a CD-ROM driven by the CD-ROM drive 52 and a floppy disk driven by the floppy disk drive 53 with the RAM 33 as a work area.

Through the function implemented as described above, the image processing apparatus of the embodiment performs processing similar to that of the first embodiment on image data inputted by the image input apparatus 57 or image data made in the image processing apparatus (computer), and produces output image data with reduced gradation levels to the image output apparatus 58.

The remainder of operation and effects of the embodiment are similar to those of the first embodiment.

The functions similar to those of the image processing apparatus of the second embodiment may be implemented in a form of software using a computer as in the third embodiment.

The present invention is not limited to the embodiments described so far but may be practiced in still other ways within the scope of the invention. For example, the quantization levels, the number of quantization levels, the filter characteristics and so on are those for illustration purposes and may be set depending upon a mode of application of the present invention.

Although input image data is converted to output image data of three gradation levels as a final output in the above embodiments, the invention may be applied to the case where input image data is converted to output data of four or more gradation levels.

The invention is effective for reducing the number of gradation levels of image data to be outputted to an ink-jet printer, a fusing thermal transfer printer, a thermo- autochrome printer, a display for representing fewer gradation levels and so on. In addition, the invention is effective for reducing the number of gradation levels of image data for lessening a load on image processing and storage of image data.

According to the image processing method or apparatus of the invention as described so far, the two-stage error diffusion processing of different quantization levels is performed on the input image data. The output image data with reduced gradation levels is thus obtained. As a result, a high-quality image with a uniform texture and reduced roughness is obtained through the multi-level error diffusion processing while the gradation levels of the image data is reduced. In addition, in the error diffusion processing of the first stage, the input image data is quantized only when the gradation value thereof is within the predetermined quantization-executable range. Accordingly, it is possible that the dispersibility of dots in the highlight region and the shadow region is enhanced and the image quality of the output image is improved.

According to the image processing method or apparatus of the invention, the gradation values at both ends of the quantization-executable range are set to be values close to the quantization level of the error diffusion processing of the second stage included within the quantization-executable range rather than central values between the quantization level of the error diffusion processing of the second stage included within the quantization-executable range and the quantization levels of the error diffusion processing of the second stage adjacent thereto. As a result, image unevenness due to interference between the quantization errors produced through the first stage of error diffusion processing and those produced in the second stage thereof can be reduced and an image of a higher quality can thus obtained.

According to the image processing method or apparatus of the invention, the modulation characteristics for quantization errors are different between the first and second stages of error diffusion processing. As a result, interference is prevented between quantization errors produced in the first stage of error diffusion processing and those produced in the second stage thereof. An image of a higher quality can thus obtained.

According to the image processing method or apparatus of the invention, the modulation characteristic for quantization errors in the second stage of error diffusion processing is set so that gains are higher in a low frequency band, as, compared to the first stage. An image with a more uniform texture is thus obtained.

Obviously, many modifications and variations of the present invention are possible in the light of the above teachings. It is therefore to be understood that within the scope of the appended claims the invention may be practiced otherwise than as specifically described.

What is claimed is:

1. An image processing method comprising:
    a first error diffusion processing step for quantizing input image data for each pixel to convert the quantized input image data into image data having a predetermined quantization level for outputting and diffusing a quantization error of a target pixel produced through quantization to input image data of unquantized pixel near the target pixel when the gradation value of the input image data is within a predetermined quantization-executable range, and for outputting the input image data without quantizing the input image data when the gradation value is not within the predetermined quantization-executable range; and a second error diffusion processing step for quantizing the image data outputted by the first error diffusion processing step for each pixel to convert the quantized image data into output image data having one of three or more quantization levels including a quantization level different from the quantization level in the first error diffusion processing step for outputting and for diffusing a quantization error of the target pixel produced through quantization to image data of unquantized pixel near the target pixel.

2. An image processing method according to claim 1, wherein the first error diffusion processing step comprises the step of quantizing the input image data using gradation values at both ends of the quantization-executable range as quantization levels, when the gradation value of the input image data is included within at least one quantization-executable range including quantization level of respective quantization levels of the second error diffusion processing step except for the minimum quantization level and the maximum quantization level.

3. An image processing method according to claim 2, wherein the gradation values at both ends of the quantization-executable range are close to values of the quantization levels of the second error diffusion processing step included within quantization-executable range rather than the central values between a quantization level of the second error diffusion processing step included within the quantization-executable range and a quantization level of the second error diffusion processing step adjacent thereto.

4. An image processing method according to claim 1, wherein the first error diffusion processing step and the second error diffusion processing step comprise the step of diffusing quantization errors with characteristics different from each other thereby to modulate the quantization errors to high frequency bands with modulation characteristics different from each other.

5. An image processing method according to claim 4, wherein the modulation characteristic for quantization errors in the second error diffusion processing step is set so that gains are higher in a low frequency band, as compared to the first error diffusion processing step.

6. An image processing apparatus comprising:
first error diffusion processing means comprising selective quantization means for quantizing input image data for each pixel to convert the quantized input image data into image data having a predetermined quantization level for outputting, when the gradation value of the input image data is within a predetermined quantization-executable range, and for outputting the input image data without quantizing the input image data, when the gradation value of the input image data is not within the predetermined quantization-executable range, and first error diffusion means for diffusing a quantization error of a target pixel produced through quantization in the selective quantization means to input image data of an unquantized pixel near the target pixel; and a second error diffusion processing means comprising quantization means for quantizing the image data outputted by the first error diffusion processing means for each pixel to convert the quantized image data into output image data having one of three or more quantization levels including a quantization level different from the quantization level at the selective quantization means for outputting, and second error diffusion means for diffusing a quantization error of the target pixel produced through quantization in the quantization means to image data of an unquantized pixel near the target pixel.

7. An image processing apparatus according to claim 6, wherein, the selective quantization means quantizes the input image data using gradation values at both ends of the quantization-executable range as quantization levels, when the gradation value of the input image data is included within at least one quantization-executable range including quantization level of respective quantization levels of the second error diffusion processing means except for the minimum quantization level and the maximum quantization level.

8. An image processing apparatus according to claim 7, wherein the gradation values at both ends of the quantization-executable range are close to values of the quantization levels of the second error diffusion processing means included within quantization-executable range rather than the central values between a quantization level of the second error diffusion processing means included within the quantization-executable range and a quantization level of the second error diffusion processing means adjacent thereto.

9. An image processing apparatus according to claim 6, wherein the first error diffusion processing means and the second error diffusion processing means diffuse quantization errors with characteristics different from each other thereby to modulate the quantization errors to high frequency bands with modulation characteristics different from each other.

10. An image processing apparatus according to claim 9, wherein the modulation characteristic for quantization errors in the second error diffusion processing means is set so that gains are higher in a low frequency band, as compared to the first error diffusion processing means.

* * * * *